April 14, 1931.  T. M. ROBERTS ET AL  1,800,318
METHOD OF AND MEANS FOR HEATING AUTOMOBILES
Filed Dec. 18, 1926  4 Sheets-Sheet 1
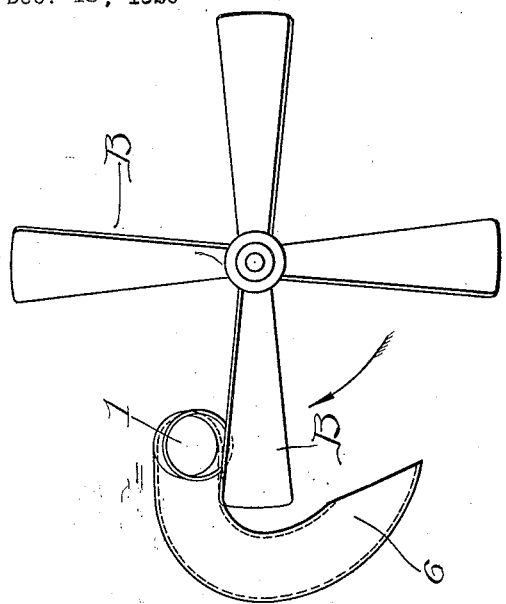
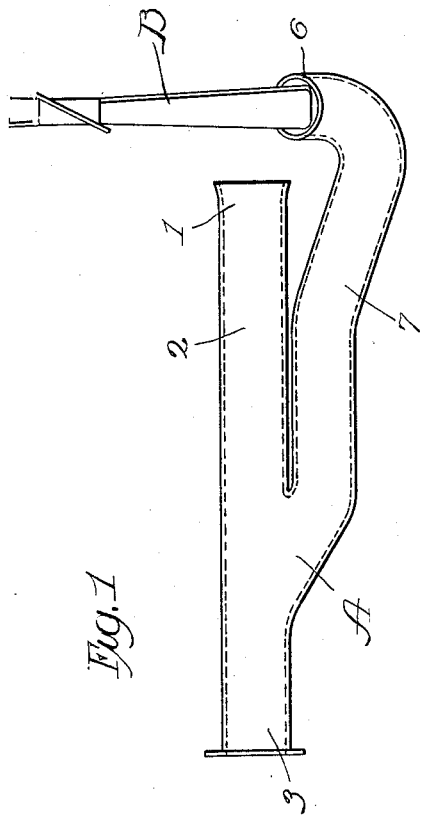
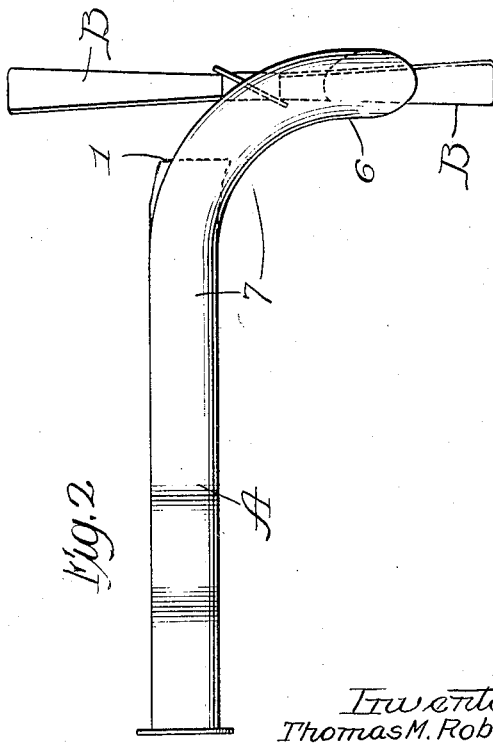
Inventors:
Thomas M. Roberts
Thomas Bovey
Sidney J. V. Bovey
By Rector, Hibben, Davis & Macauley
Their Attys.

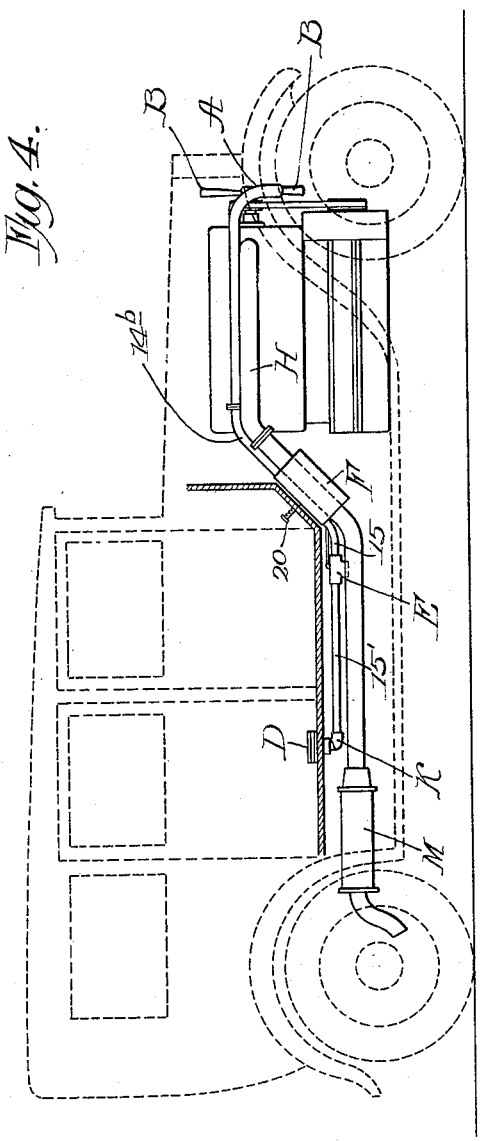
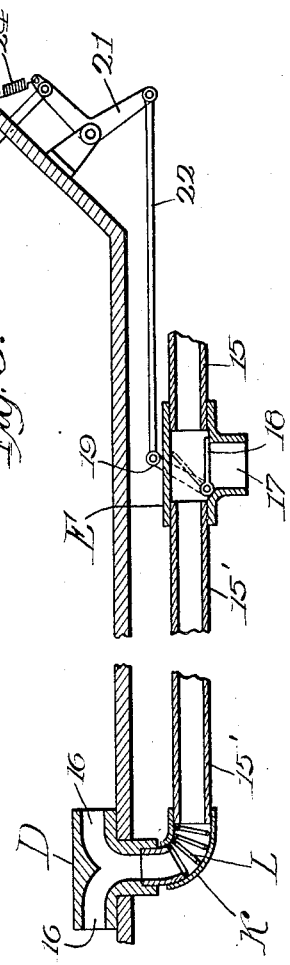

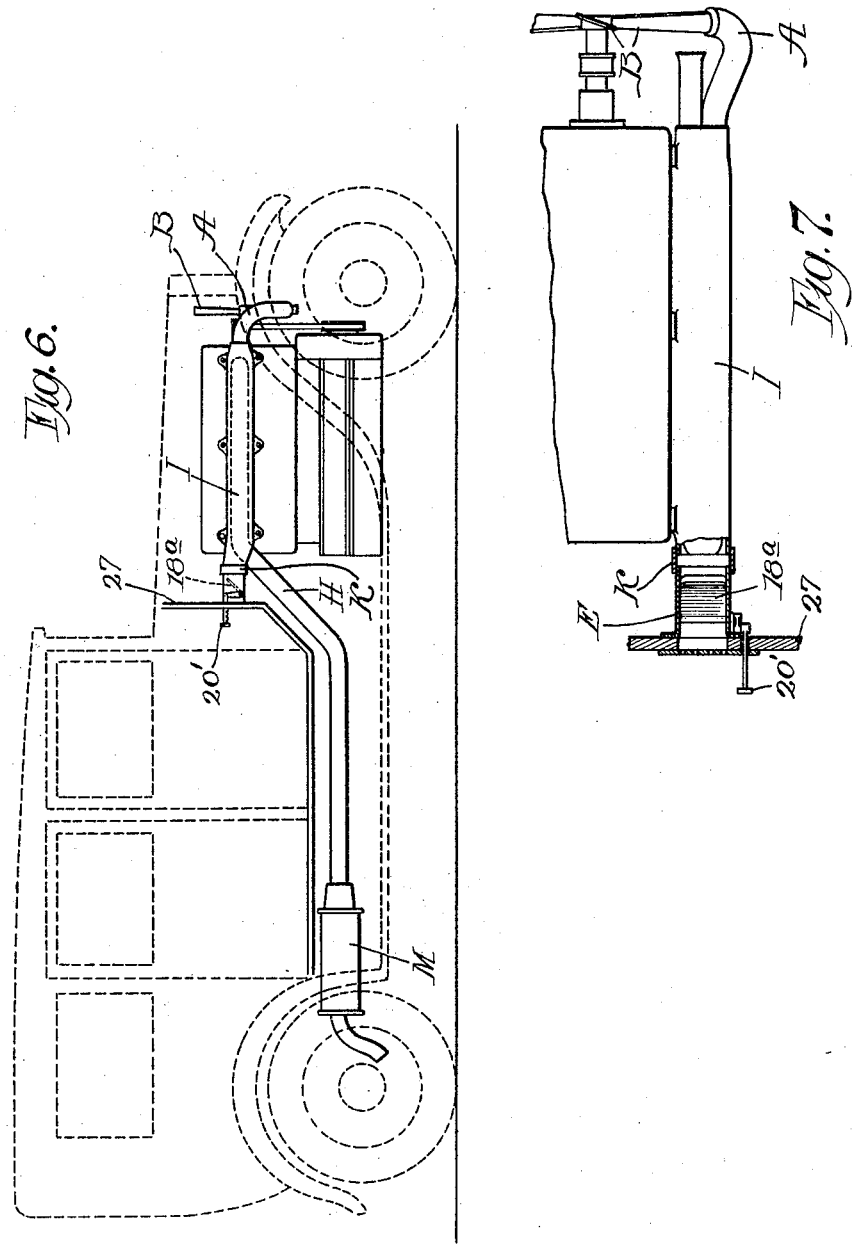

April 14, 1931.   T. M. ROBERTS ET AL   1,800,318
METHOD OF AND MEANS FOR HEATING AUTOMOBILES
Filed Dec. 18, 1926   4 Sheets-Sheet 4
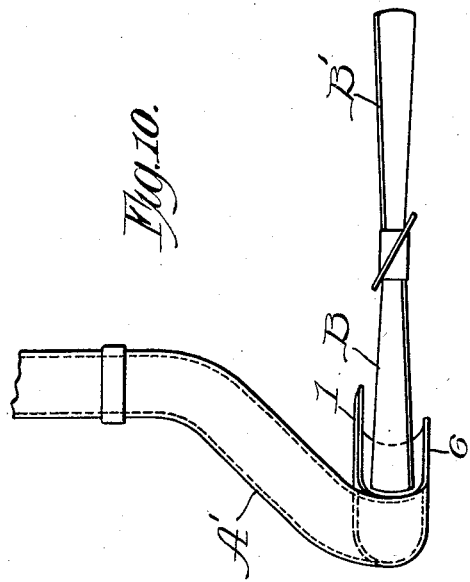
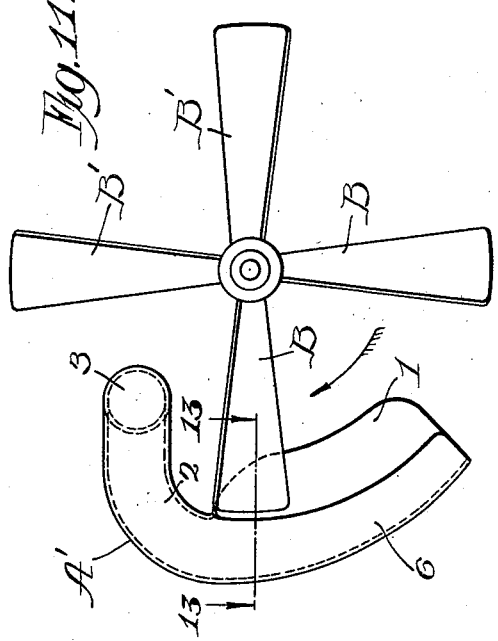
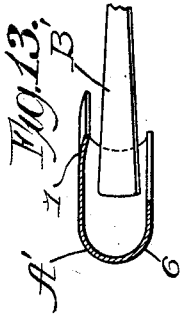
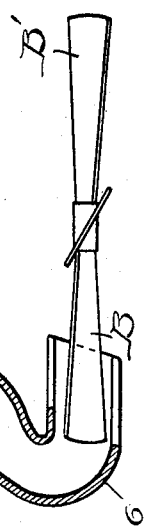
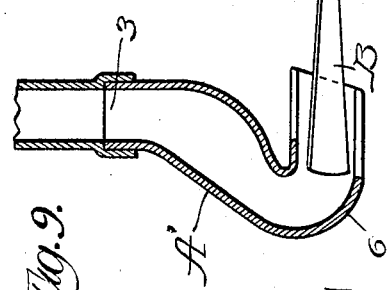
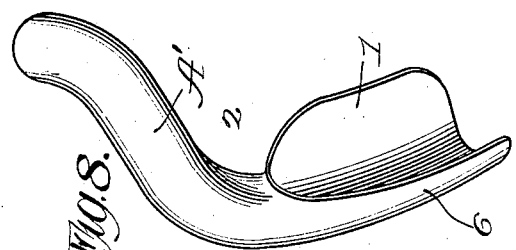

Patented Apr. 14, 1931

1,800,318

UNITED STATES PATENT OFFICE

THOMAS M. ROBERTS, THOMAS BOVEY, AND SIDNEY J. V. BOVEY, OF CHICAGO, ILLINOIS, ASSIGNORS, BY MESNE ASSIGNMENTS, TO METALCRAFT HEATER CORPORATION, OF GRAND RAPIDS, MICHIGAN, A CORPORATION OF MICHIGAN

METHOD OF AND MEANS FOR HEATING AUTOMOBILES

Application filed December 18, 1926. Serial No. 155,608.

This invention relates primarily to the utilization of currents of air generated by a fan operated by the motive power of an automobile for the purpose of heating the interior of the body of the automobile, with the front of the radiator either open to permit air to pass through it or closed to prevent passage of any air through it or with any degree of opening between fully open and fully closed condition.

It is well known that the current of air which passes through the blades of a fan operated by the motive power of an automobile in an axial direction has been used as a supply of moving air to be brought into contact with heated surfaces and used to heat the interior of the body of the automobile.

Illustrations of such use of this axial current of air for heating purposes are found in the manifold type hot air heaters; in the type in which a casing is clamped around a portion of the exhaust pipe; in the type in which the gases from the exhaust are connected to a heating unit through which the currents of air to be heated are passed; and the muffler type in which the muffler is equipped with passages through which the currents of air to be heated are passed.

During the winter season it is necessary to regulate the amount of cold air passing through the radiator in order to keep the internal combustion engine warm enough to operate economically and to so control the degree of heat that the anti-freezing portion of the cooling liquid will not boil and pass off as a vapor.

The regulation required is accomplished by providing a covering, generally referred to as a winter-front, for the front of the radiator. The cover is provided with adjustable openings to permit the required amount of air to pass through the radiator or to shut it out entirely.

The use of the winter-front has limited the commercial use of the heaters referred to above, all of which depend on axial currents of air from the fan, due to the reduced amount of heated air delivered into the interior of the body of the automobile by adjustment of the openings in the winter-front to partially closed or to closed position.

Efforts to remedy this serious trouble have been made, such as putting an opening in the winter-front so that enough air can always pass through the radiator to operate the heater. Also branch connections have been extended from the passageway leading to the heating element to points below or outside the radiator so that the motion of the car will tend to force air through the branches and into the heater. But none of the above expedients have solved the problem and such axial type heaters are not completely successful.

We have discovered that when the openings of the winter-front are adjusted to closed position so that no air can pass through the radiator, the cooling fan of the automobile causes currents of air to travel along the length of the fan blades in an outward radial direction in sufficient quantities so that a portion of them will be enough to properly heat the interior of the body of the automobile.

The object of this invention is to provide a method and means by which a portion of such outward radial currents of air can be collected from near the edges of the fan blades, delivered to heated surfaces and into the interior of the body of the automobile in sufficient quantities to keep the interior of the car just as warm when no air is passing through the radiator as when a full supply is passing through; so that the interior of the car may be properly heated regardless of whether any air is passing through the radiator.

Another object of the invention is to so locate the means for receiving the current of air moving through the fan in an axial direction that it will not be subjected to a suction which we have found to exist near the center of the fan when no air is being drawn through the radiator, as when the winter-front is completely closed.

Other objects and advantages will appear from the following descriptions of illustrated embodiments of the present invention as applied to different types of heaters.

Referring to the drawings which accompany and form a part of this specification:

Figure 1 is a plan view, Figure 2 is a side view and Figure 3 an end view of a fan operated by the motive power of an automobile with the collecting member for receiving the radial and/or axial currents from the fan in assembled position;

Figure 4 shows the collecting member as assembled into a complete heating system for an automobile with a different style of heating unit;

Figure 5 shows a method of controlling the admission of heated air to the interior of the automobile;

Figure 6 shows the collecting member as assembled with a manifold heating unit;

Figure 7 is an enlarged view of the manifold heating unit and control shown in Figure 6; parts being broken away and parts being shown in section.

Figure 8 is an isometric view of a modification of the means for receiving the axial or radial currents of air as generated by a fan operated by the motive power of the automobile;

Figure 9 is a view showing the modified collecting means of Figure 8 in section as assembled with the fan;

Figure 10 is a plan view of said modified collecting means of Figure 8 assembled with the fan;

Figure 11 is a front view of Figure 10;

Figure 12 is a side view of a portion of the collecting means shown in Figure 11;

Figure 13 is a sectional plan view of the collecting means of Figure 8 on the line 13—13 of Figure 11.

Figures 1 to 3, inclusive, of the drawings illustrate one form of collecting means A embodying this invention and consisting in general of a tubular Y-shaped body. Said body is provided with an opening 1, positioned behind a fan B operated by the motive power of an automobile and near the outer portion of the fan blades, for intercepting a portion of the air currents which are drawn through the fan in an axial direction.

A passageway 2 transmits the air currents thus collected to an outlet opening 3 from which the air is passed through a heated chamber and into the body of the automobile to heat the interior of the body. This much as a method of heating the automobile with the axial currents of air from the cooling fan is old taken by itself and can be used successfully as long as air can be drawn axially through the radiator by the fan in sufficient quantity to properly heat the car.

The engine for operating the car being a heat-creating machine must be kept at a temperature betwen 150 to 170 degrees Fahrenheit for highest operating efficiency. Fifty to seventy-five per cent of all premature motor wear is caused by failure to regulate the quantity of cold air which passes through the cooling radiator of the automobile to insure the motor temperature being between 150 and 170 degrees. Such common troubles as premature cylinder wear, extreme carbonization, corrosion, condensation, fouled spark plugs, excessive crank case dilution and high gas consumption all result directly from cold weather operation without proper control of the quantity of air passing through the radiator.

Winter fronts of various forms, adjustable to completely or partially cut off the flow of air through the radiator have been employed for controlling the temperature of the engine; and the necessity of using a winter-front has prevented this axial type hot air heater from being a complete success.

We have discovered a way to provide air currents from behind the radiator and within the hood sufficient to heat the interior of the car without interfering with the construction or regulation of any type of winter-front and without using air currents created by the motion of the car and collected outside of the radiator and hood. The discovery is that when a winter-front is adjusted to closed position air currents are being thrown outward radially by the cooling fan B in such quantity that a portion of them will be sufficient to heat the car. Acting upon this discovery we have provided means for collecting either a portion of the outward radial currents or a portion of the axial currents of air as generated by the fan B, or from both sources if required, the result being that a continuous and steady current of air will be delivered to heated surfaces in any quantity required to sufficiently heat the interior of the automobile while the fan B is in operation, regardless of whether the winter-front is adjusted to admit more or less air to the radiator or is completely closed to cut off all air from the radiator.

In Figures 1 to 3, inclusive, the collector A is a Y-shaped member having two openings 1 and 6 for receiving air currents and an outlet opening 3 for connection with a heating unit. The inlet opening 6 is located near the circumference of the circle of the blades of the fan B to collect a portion of the outward radial currents of air as generated by the fan B. The inlet opening 1 is located behind the fan blades to collect a portion of the axial currents of air as generated by the fan B. A passageway 2 connects the inlet opening 1 with the outlet 3 and a passageway 7 connects the inlet opening 6 with the passageway 2. When the winter-front is adjusted to closed position a portion of the radial currents will be collected at 6 and transmitted through the passageways 7 and 2 to the outlet 3 and thence to the heating unit. When the winter-front is adjusted to open position a portion of the axial currents will be collected at 1 and delivered through the passageway 2 and outlet 3 to the heating unit.

We have found that the quantity of air delivered to the heater when the outward radial currents are being collected will be reduced if the inlet opening 1 is placed so near the center of the fan as to be within the range of the suction which is created at the central portion of the blades of the fan B. We, therefore, locate the inlet opening 1 near the ends of the blades and form the passageway 2 so that the center of the inlet opening 1 is somewhat below the center of the passageway 2, as shown in Figures 2 and 3, which position has given us the best results.

The construction of one type of control for admitting the heated air to the car is shown in Figure 5. D represents the register within the car having outlet opening 16 connected with the air pipe 15'. E represents a control valve casing having an outlet opening 17 connected to atmosphere and a hinged valve 18 for closing outlet opening 17 when heat is desired in the car. When the heat is to be cut off from the interior of the car the valve 18 may be moved into the opposite position to open the outlet 17 to atmosphere, as shown by the dotted lines. The valve 18 is operated by the foot piece 20, the bell crank lever 21 and the rod 22 to a position desired, and retained in such position by engagement of one or another of the notches 23 with the floor board. The spring 24 closes valve 18 when the pedal 20 is moved to disengage the notches 23 from the floor board.

In the hot air pipe 15 is inserted a fire resisting fabric tubing K having within it a coiled spring L. This prevents any of the noises incident to the operation of the engine from entering the interior of the car. The spring L within the tubing K keeps it open to its full diameter to permit free passage of the heated air. This particular feature is not claimed herein.

In Figure 4 is shown a different installation of a heating system for an automobile embodying this invention, comprising the exhaust casing type of heater, consisting of the radial-axial collecting member A assembled to receive air from the cooling fan B, a heating unit F associated with the exhaust pipe H, and connected at one end with the radial-axial collecting member A by the air pipe 14$^b$ and at the other end with the control valve casing E.

Thus the air received by the radial-axial collecting member A will be brought into contact with the heated surface of that portion of the exhaust pipe encircled by the heating unit F, and transmitted to the interior of the car as desired through the control valve E and the register D.

In Figures 6 and 7 is shown another type of heating system for an automobile embodying this invention, comprising what is termed a manifold type heater. The manifold of the exhaust pipe H is covered by a casing member I. One end of the member I is formed as the axial-radial collecting member A to receive the outward radial or axial currents of air as generated by the cooling fan B. The other end portion of the member I unites with the casing E for the hinged valve 18$^a$. This valve casing is mounted upon the body front 27 through which the control pedal 20' passes.

In Figures 8 to 13, inclusive, we have illustrated a modified form of the invention, wherein a funnel-shaped collecting member A' is employed. Figures 9, 10, 11 and 13 show it assembled with the fan B'. The collecting member A', shown in isometric view in Figure 8, consists of a receiving or collecting portion which forms a segment of a cylindrical shell having a semi-circular peripheral surface, one portion of the shell being cut away as shown in Figure 11.

At one end of this segmental portion and integral therewith is a curved tubular passageway 2', with an outlet opening 3', the collecting member thus formed being a funnel shaped piece having a mouth or receiving portion adapted to receive either axial and/or radial currents of air from the fan B', the passage 2' being connected to the collecting mouth piece and an outlet opening 3' from which the air currents can be transmitted to a heating unit and into the automobile as hereinabove described.

In Figures 9, 10, 11 and 13 the collecting member A' is shown in its assembled position with reference to the fan B'. Axial currents are intercepted and delivered to the passageway 2' by the deflecting portion 1' positioned behind and near the outer ends of the fan blades. Radial currents are intercepted and delivered to the passageway 2' by the semi-circular peripheral deflecting portion 6 positioned beyond the outer ends of the fan blades. This type of collecting member is better suited to certain installations than the type illustrated in Figures 1 to 3 inclusive. The principle of operation is the same; cost, looks and the space available will determine which type shall be used in any given case.

What we claim as our invention is:

1. A device of the class described having an outlet opening, an inlet opening for receiving axial currents of air from a fan operated by the motive power of an automobile, a passage connecting said openings, a second inlet opening for receiving radial currents of air from said fan, and means for delivering said radial currents into said passage.

2. A device of the class described consisting of a Y-shaped body having an outlet opening, an inlet opening for receiving axial currents of air from a fan operated by the motive power of an automobile, a second inlet opening for receiving radial currents from said fan, and passages connecting said openings.

3. An air-current collecting device adapted to receive a portion of the axial and radial currents of air as generated by a fan operated by the motive power of an automobile, said device having a deflecting collector part behind said fan and a second deflecting collector part beyond the end edges of the blades of said fan and means for delivering the air currents intercepted by said deflectors to a common source.

4. In combination, a fan operated by the motive power of an automobile, an air-current collecting device having a deflector part behind the fan, a second deflector part beyond the end edges of the blades of said fan, and a passage for delivering the air currents intercepted by both said deflector parts.

THOMAS M. ROBERTS.
THOMAS BOVEY.
SIDNEY J. V. BOVEY.